Figure 1:
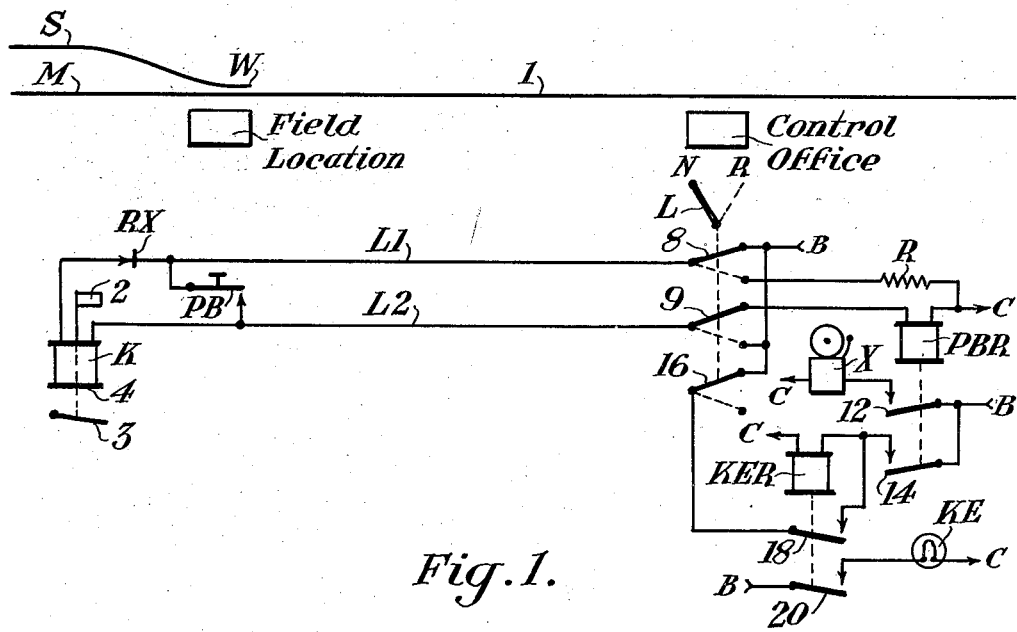

Aug. 29, 1950   H. C. VAN TASSEL ET AL   2,520,865
REMOTE CONTROL AND INDICATION SYSTEM
Filed Dec. 3, 1946

INVENTORS
Harry C. Van Tassel and
BY Paul M. Brannen.
THEIR ATTORNEY

Patented Aug. 29, 1950

2,520,865

UNITED STATES PATENT OFFICE 2,520,865

REMOTE CONTROL AND INDICATION SYSTEM

Harry C. Van Tassel, Swissvale, and Paul M. Brannen, Duquesne, Pa., assignors to The Union Switch & Signal Company, Swissvale, Pa., a corporation of Pennsylvania Application December 3, 1946, Serial No. 713,636

2 Claims. (Cl. 246—3)

Our invention relates to remote control and indication systems, and particularly to remote control and indication systems using only two wires between the control point and the field.

In many instances it is desired to effect an indication at the control point of a condition at the field location, but it is undesirable to have a source of energy at the field location for supplying energy to effect an indication at the control point. For example, in railway signaling it is often desirable to provide an indicator at a hand-operated railway track switch which will indicate whether or not the switch may be operated, and to have the indicator manually controlled from a distant control point. Some type of communication must be afforded between the indicator, or field location, and the control point, in order that trainmen may request an indication as to whether or not the switch should be operated.

It is an object of our invention to provide an arrangement of apparatus of the type described, in which one source of energy is used for control and indication purposes, and that source of energy is located at the control point.

Another object of our invention is to provide an arrangement of apparatus of the type described, in which an individual at the field location may communicate with the operator at the control point over the same two wires that are used to control a device at the field location from the control point.

Another object of our invention is to provide improved means of manually controlling a railway track switch indicator from a distant control point and for communicating from the railway track switch indicator to the control point.

Other objects of our invention and features of novelty will be apparent from the following description taken in connection with the accompanying drawings.

We shall describe two forms of remote control and indication apparatus embodying our invention, and shall then point out the novel features thereof in claims.

In practicing our invention, we employ an indicator or relay at the field location arranged to respond in one manner when supplied with energy of one polarity, and to respond in another manner when supplied with energy of the opposite polarity. The indicator or relay is energized by energy supplied over two line wires from a source located at the control point. A control switch having two positions is interposed in such a manner as to provide energy of one polarity when in its first position and to supply energy of the opposite polarity when in its second position. Indication or communication from the field location is achieved by a control contact at the field location which is connected so that it may be operated to provide a low resistance path for the control energy at times. An indication relay at the control point is connected in series with the supply of energy and is selected and arranged so that the contacts of the relay will not be operated by energy of the value necessary to operate the indicator or relay at the field location, but will operate its contacts if the flow of energy supplied to the field location is increased due to the by-passing effect of the previously described contact. The contacts of this relay may be used to control various indicating devices.

Figure 2:
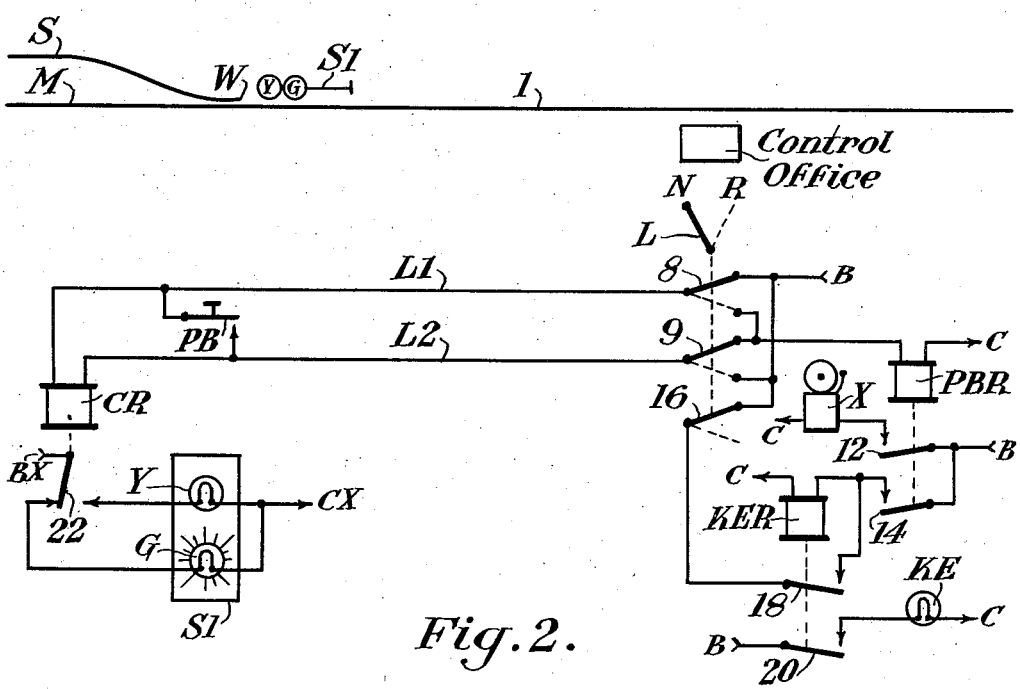

In the drawings,

Fig. 1 is a diagram of an arrangement embodying our invention for manually controlling a switch indicator and providing means of communication from the field location of the indicator to the control point; and Fig. 2 is a diagram of an arrangement embodying our invention for controlling a signal from a remote point, and communicating from the signal location to the control point.

Similar reference characters refer to similar parts in each of the two views.

Referring to Fig. 1, there is shown therein a stretch of railway track 1, having a hand-operated switch W located at a field location situated at a point remote from a control office. It is assumed that the train operations in this region are such that the switch W is to be operated only if authorized by the operator at the control office. An indicator or relay K is located adjacent the switch for the purpose of indicating whether or not the switch may be operated. In a symbolic form we have shown a type of indicator well known in the railway signaling art which includes a miniature semaphore arm 2 which is linked mechanically to an armature 3 which is attracted by an electromagnet 4 when energy is supplied thereto. The indicator or relay K is constructed so that when the winding 4 is energized, the miniature semaphore arm is moved to a position which denotes that the switch may be operated, and when the winding 4 is deenergized, the miniature semaphore arm is moved to a position which denotes that the switch may not be operated.

A pair of line wires L1 and L2 extend between the field station and the office or control point and energy from a source at the office is supplied over these line wires to the winding of the indicator K. A rectifier RX is connected in series with the winding 4 so that energy of one polarity only may flow through the winding 4. A normally open push button contact PB is connected across the wires L1 and L2 on the other side of the rectifier RX from that to which the electromagnet 4 is connected. This push button is mounted on or adjacent the indicator.

At the control office, energy is supplied to the line wires over pole changing contacts 8 and 9 which are operated by a lever L, having a normal and a reverse position. Energy is supplied by a source of direct current, not shown, whose positive and negative terminals are denoted as B and C, respectively.

An indication relay PBR is connected in series with the source of energy when the pole changing contacts 8 and 9 are in their normal position, and a bell X and an auxiliary relay KER are controlled by contacts 12 and 14 of this relay in a manner which will be explained subsequently.

With the equipment in its normal condition as shown in the drawings, line wire L1 is connected to terminal B over contact 8 in its normal position, and line wire L2 is connected over contact 9 in its normal position and through the winding of relay PBR to terminal C.

As positive terminal B of the source is connected to line wire L1 the rectifier RX prevents flow of energy from the source over the circuit which includes the line wires L1 and L2 and the windings of the relays K and PBR. Accordingly, the armature 3 of relay K is released and causes the miniature semaphore arm 2 to indicate that the switch W should not be operated, while at the office the contacts 12 and 14 of relay PBR are released with the result that the circuits of the bell X and of the lamp KE are interrupted.

It is now assumed that a trainman desires to operate switch W and he presses the push button PB, closing its contact. Energy will now flow through the circuit which is traced from terminal B over pole changing contact 8, line wire L1, the closed contact of the push button PB, through line wire L2, over pole changing contact 9 and through the winding of relay PBR to terminal C. Accordingly, relay PBR is energized and its contacts pick up with the result that the bell X is now supplied with energy by a circuit which is traced from terminal B over front contact 12 of relay PBR, and through the bell X to terminal C. The bell X will now sound, signaling to the operator at the control office that permission to operator switch W has been requested. Also, when relay PBR picks up, the auxiliary relay KER is supplied with energy over its pick-up circuit which is traced from terminal B over front contact 14 of relay PBR and through the winding of relay KER to terminal C. When relay KER picks up, a stick circuit is established to retain the contacts of relay KER in their picked-up position. This circuit is traced from terminal B over normal contact 16 of lever L, front contact 18 of relay KER, and through the winding of relay KER to terminal C. When the contacts of relay KER pick up, indication lamp KE is supplied with energy over front contact 20 of relay KER, and thus furnishes a visual indication of the operation of the push button PB.

When the trainman releases the push button PB, the circuit which was previously traced for supplying energy to relay PBR is interrupted and its contacts release, thus interrupting the supply of energy to the bell X and it ceases to operate. However, the relay KER is retained in its picked-up position by the stick circuit previously traced, after the pick-up circuit controlled over contact 14 of relay PBR is opened by the release of that relay. Accordingly, in addition to the temporary audible indication provided by the bell X, a persistent visible indication provided by the lamp KE is afforded to the operator denoting that the push button PB has been operated by a trainman requesting permission to operate the switch W.

If the operator desires to give the trainman permission to operate the switch W, he will operate the lever L to its reverse position. This causes the pole changing contacts 8 and 9 to move from their normal to their reverse position, thereby reversing the polarity of the energy supplied from the source to the line wires L1 and L2 with the result that energy is supplied to the winding of relay K over the circuit which is traced from terminal B over reverse contact 9, line wire L2, through the winding of indicator K, through the rectifier RX, over line wire L1, and through resistor R to terminal C. Accordingly, the electromagnet 4 of indicator K is energized and attracts armature 3 which thus moves the miniature semaphore arm 2 to its clear position, in which it indicates to the trainman that he may move the switch W. The resistor R prevents excessive flow of current should the push button PB be operated at a time when the contacts 8 and 9 are in their reverse position.

When the lever L is moved to its reverse position the contact 16 is opened, thereby interrupting the stick circuit for relay KER. Accordingly, relay KER releases and the supply of energy to the indication lamp KE is interrupted.

If the operator at the control office desires to rescind the permission to operate switch W, he moves lever L to its normal position, thereby returning the circuits to the condition which was previously described, in which the polarity of the energy supplied to the line wires is such that the rectifier RX prevents flow of energy through the winding of relay K so the relay armature releases and moves the semaphore arm to its lower position.

It is to be understood that the arrangement of audible and visible indications such as is shown in Fig. 1 may be changed if desired.

Referring to Fig. 2 of the drawings, there is shown therein a stretch of railway track 1 having a hand-operated switch W, the movements over this switch being controlled by a signal S1, which as shown is a color-light type signal having a yellow lamp Y and a green lamp G. The yellow lamp Y indicates to an approaching train that it should move into the siding S, over the switch W, while the green lamp G indicates to an approaching train that it should continue on the main track M over switch W.

The lamps of signal S1 are supplied with energy from a source, not shown, the terminals of which are denoted as BX and CX, respectively. The circuits of the lamps are governed by contact 22 of a polarized control relay CR. Relay CR is operated by energy supplied over line wires L1 and L2 from the control office and is of a type the contacts of which remain in the position to which they were last operated until energy of opposite polarity is supplied to the winding of the relay, at which time the contacts operate to a position corresponding to the polarity of energy supplied to the relay winding. The relay CR is constructed so that when energy flows through the winding from left to right the contacts of relay CR move to their left-hand or normal position, and when energy flows through the winding of relay CR from right to left the contacts of relay CR are moved to their right-hand or reverse position. When the contact 22 of relay CR is in its left-hand or normal position a circuit is established to supply energy to the green lamp G of signal S1. When the contact 22 of relay CR is in its right-hand or reverse position a circuit is established for supplying energy to the yellow lamp Y of signal S1.

At the control office energy is supplied to the line wires L1 and L2 over pole changing contacts 8 and 9 which are operated by lever L, which has a normal and a reverse position. Energy is supplied by a source of direct current, not shown, whose positive and negative terminals are denoted as B and C, respectively.

An indication relay PBR is connected in series with the source of energy when the pole changing contacts 8 and 9 are in either their reverse or their normal position, and this relay is constructed so that its contacts will not pick up on energy of the value which is supplied to the relay winding when the winding of relay CR is included in series with the circuit over which energy is supplied to the relay PBR, but will pick up when an increase in flow of energy is caused by the closing of the push button PB. The circuits for controlling the bell X, the relay KER, and the indication lamp KE are identical with the corresponding circuits shown in Fig. 1 and a further description of their construction and operation is unnecessary.

With the equipment in its normal condition as shown, energy flows from terminal B over contact 8 in its normal position, over line wire L1, through the winding of relay CR from left to right, over line wire L2, over contact 9 in its normal position, and through the winding of relay PBR to terminal C. Accordingly, the contact 22 of relay CR is held in its normal position, and the green lamp G of signal S1 is lighted, indicating that trains may move past signal S1 on the main track M. At this time the value of energy flowing in the circuit described above is insufficient to cause the relay PBR to pick up its contacts and the circuits for the bell X and the relay KER are not established.

It is now assumed that a trainman desires permission to move a train into the siding S over switch W. He presses the push button PB and the contact of the push button PB closes and establishes a connection between line wires L1 and L2 which is independent of the winding of relay CR. The increase in the flow of energy in the circuit of relay PBR on elimination of the resistance represented by the winding of the relay CR on pressing the push button PB is such that the contacts of relay PBR pick up and establish the circuit for supplying energy to the bell X and to the auxiliary relay KER. As a result, both the visual and audible indications are established at the control office denoting that a trainman desires permission to operate the switch W. It will be seen that although the winding of relay CR is shunted by the closing of the contact of push button PB, thereby cutting off the supply of energy through the winding, the contact 22 of relay CR will remain in its normal position.

If the operator at the control office desires to give permission for the requested move, he will operate the lever L to its reverse position, thus causing the pole changing contacts 8 and 9 to move to their reverse positions. Accordingly, the polarity of energy supplied to the line wires L1 and L2 is reversed and, assuming that the push button PB has been reversed, the circuit for supplying energy to relay CR is now traced from terminal B over pole changing contact 9 in its reverse position, over line wire L2, through the winding of relay CR from right to left, over line wire L1, over pole changing contact 8 in its reverse position, and through the winding of relay PBR to terminal C. As a result, contact 22 of relay CR is operated to its reverse position and establishes the circuit of the yellow lamp Y of signal S1.

The operator may restore the indication of signal S1 to its normal aspect with the green lamp displayed by returning lever L to its normal position. However, should he leave the lever L in its reverse position, and thereafter a trainman desires permission to operate a train over the switch W onto the main track M, it will be seen that the operation of the push button PB will again produce an effect similar to that previously described and will cause relay PBR to pick up its contacts and cause the visual signal to be displayed and the audible signal to indicate that the trainman wishes permission to operate switch W. Accordingly, the indicating means shown in Fig. 2 will operate to indicate a condition in the field to the office notwithstanding the position of the control lever at the time the push button PB is operated.

It is to be understood, as was pointed out in connection with Fig. 1, that the arrangement of indication lights and audible signals may be varied from that shown to suit any particular requirements.

Although we have herein shown and described only two forms of apparatus embodying our invention, it is understood that various changes and modifications may be made therein within the scope of the appended claims without departing from the spirit and scope of our invention.

Having thus described our invention, what we claim is:

1. In a railway track switch indicator control system, in combination, a hand-operated railway track switch, an indicator to indicate whether or not said switch may be operated, said indicator being of a type having a winding which when energized causes an indication to be displayed authorizing operation of the switch it governs, an asymmetric unit conected in series with said winding, said asymmetric unit being poled so that current of one polarity only will flow through said asymmetric unit and said winding, said asymmetric unit and said winding being connected in series to a pair of wires extending to a control office, a manually operated contact at said switch indicator for establishing a connection between said line wires independent of said winding and said asymmetric unit, a source of direct current energy at the control office, an indication relay, a resistor and pole changing means at the office, said pole changing means when operated to one position connecting said source of energy in series with said resistor to said line wires at a polarity which supplies current of said one polarity for the current to flow through said indicator and asymmetric unit to energize the indicator, and when operated to a second position connecting said source of energy in series with said indication relay to said line wires at a polarity which supplies current of the polarity opposite said one polarity, indication means operated by contacts of said indication relay, and said indication relay being constructed and arranged so that its contacts are picked up when and only when there is supplied to the relay winding energy of the value which is supplied through the relay winding when the connection between the line wires independent of said winding and said asymmetric unit is established.

2. In a railway track switch indicator control system, in combination, a hand-operated railway track switch, an indicator to indicate whether or not said switch may be operated, a switch indicator control relay means having a winding and provided with an armature which is moved from a first to a second position when and only when said winding is energized by current of a given polarity, a control office, a pair of line wires extending from said track switch to said office and across which pair of wires said winding of the control relay means is connected, a manually operated contact at said track switch operable to establish a connection across said pair of wires independent of said control relay means; a direct current source, an indication relay and a pole changer at said office; said pole changer operable to one position to connect said direct current source to said pair of wires for supplying current of a polarity which energizes said winding of the control relay means at said given polarity, said pole changer operable to another position to connect said direct current source to said pair of wires through a winding of said indication relay for supplying current of the polarity opposite said given polarity, said indicatoin relay being constructed and arranged so that its contacts are picked up when and only when there flows through its winding current of the value which is supplied to the pair of wires when said connection independent of said control relay means is established, a stick relay at said office having a pick-up circuit including a front contact of said indication relay and a stick circuit including a contact of said pole changer closed at its said other position, and an indicating device controlled by a front contact of said stick relay.

HARRY C. VAN TASSEL.
PAUL M. BRANNEN.

REFERENCES CITED

The following references are of record in the file of this patent:

UNITED STATES PATENTS

| Number | Name | Date |
|---|---|---|
| 1,719,471 | Hoffmann | July 2, 1929 |
| 1,852,368 | Plank | Apr. 5, 1932 |
| 1,852,550 | Wight | Apr. 5, 1932 |
| 1,930,517 | Hershey | Oct. 17, 1933 |
| 2,101,209 | Bacon | Dec. 7, 1937 |
| 2,156,765 | McCann | May 2, 1939 |
| 2,372,061 | Derr | Mar. 20, 1945 |